US010548006B2

(12) United States Patent
de Freitas et al.

(10) Patent No.: US 10,548,006 B2
(45) Date of Patent: Jan. 28, 2020

(54) SYSTEM AND METHOD FOR AUTHORIZING A SUBSCRIBER DEVICE

(71) Applicant: CHARTER COMMUNICATIONS OPERATING, LLC, St. Louis, MO (US)

(72) Inventors: Ewam de Freitas, St. Louis, MO (US); Rich DiGeronimo, Greenwood Village, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 64 days.

(21) Appl. No.: 14/866,088

(22) Filed: Sep. 25, 2015

(65) Prior Publication Data

US 2017/0093875 A1 Mar. 30, 2017

(51) Int. Cl.
*H04L 9/00* (2006.01)
*H04W 12/06* (2009.01)

(52) U.S. Cl.
CPC ................... *H04W 12/06* (2013.01)

(58) Field of Classification Search
CPC ................................................ H04L 63/102
See application file for complete search history.

(56) References Cited

U.S. PATENT DOCUMENTS

| | | | | |
|---|---|---|---|---|
| 2007/0039039 A1* | 2/2007 | Gilbert | ................ | G06F 21/6218 726/4 |
| 2007/0097860 A1* | 5/2007 | Rys | ......................... | H04L 63/10 370/229 |
| 2008/0289016 A1* | 11/2008 | Diab | ................... | H04L 12/2856 726/7 |
| 2013/0225282 A1* | 8/2013 | Williams | .............. | A63F 13/216 463/29 |
| 2015/0128216 A1* | 5/2015 | Rolls, IV | .............. | H04W 12/06 726/3 |
| 2016/0072797 A1* | 3/2016 | Wilson | ................ | H04L 63/0892 726/9 |

OTHER PUBLICATIONS https://www.cnet.com/news/netflix-plans-to-change-up-its-family-streaming-service by Dara Kerr Apr. 22, 2013 4:23 PM PDT.*
Dara Kerr, netflix-plans-to-change-up-its-family-streaming-service, Publisher www.cnet.com Apr. 22, 2013 (https://www.cnet.com/news/netflix-plans-to-change-up-its-family-streaming-service) (Year: 2013).*

* cited by examiner

*Primary Examiner* — Alexander Lagor
*Assistant Examiner* — Syed M Ahsan
(74) *Attorney, Agent, or Firm* — Meagher Emanuel Laks Goldberg & Liao, LLP

(57) ABSTRACT

Systems, methods, apparatus and other mechanisms of authorizing a device to receive subscriber services via a network by comprising identifying a customer premises equipment (CPE) access device in communication with a device to be authorized for receiving subscriber services, determining a location associated with the CPE access device; and authorizing the device for receiving subscriber services if the CPE access device location is a valid location for a subscriber account associated with requested subscriber services.

18 Claims, 3 Drawing Sheets

SYSTEM AND METHOD FOR AUTHORIZING A SUBSCRIBER DEVICE

FIELD OF THE INVENTION

The invention relates to authenticating customer premises equipment (CPE) and, more particularly but not exclusively, to authenticating CPE using CPE location and subscriber information and thereby prevent unauthorized usage and theft of cable television and other services.

BACKGROUND

Services such as voice, data, streaming video, streaming audio and other services are often provided to home and business customers/subscribers by telecom service providers, cable\service providers and so on. Customer premises equipment (CPE) may include various types of terminal equipment to process received cable or Internet television signals to thereby enable subscribers to view, record, and interact with the services. Among the more common consumer electronics devices are television sets, set-top boxes, cable modems, wireless routers, streaming audio equipment and gaming consoles that enable streaming services. The various devices must be authenticated in some manner to ensure that only the CPE associated with the customer/subscriber at a particular location associated with the provided services.

Unfortunately, within the context of wireless devices such as wireless routers, wireless set-top boxes or other CPE including wireless modems, it is difficult to ensure that wireless CPE associated with the customer/subscriber is in fact at the particular location for which the services are to be provided. This problem grows more acute with the progression of wireless network technology toward ever-greater ranges. Therefore, a problem exists in that CPE authorized for use by a particular customer/subscriber at one location may be used by that customer/subscriber at another location. For example, a customer with a streaming media device or smart television authorized for use at a service location may connect this device to the service provider network (directly or indirectly) at another location using the same user name and password, which connection may be violation of subscriber terms of service or service provider regulations.

SUMMARY

Various deficiencies in the prior art are addressed by systems, methods, apparatus and other mechanisms to authenticate customer premises equipment (CPE) and subscriber devices at a customer/subscriber service location by requiring CPE access via a location-specific CPE access device, such as a home cable modem. Various embodiments contemplate identifying a customer premises equipment (CPE) access device in communication with a device to be authenticated for receiving subscriber services determining a location associated with the CPE access device; and authenticating the device for receiving subscriber services if the CPE access device location is a valid location for a subscriber account associated with requested subscriber services.

BRIEF DESCRIPTION OF THE DRAWING

The teachings of the present invention can be readily understood by considering the following detailed description in conjunction with the accompanying drawing, in which.

To facilitate understanding, identical reference numerals have been used, where possible, to designate identical elements that are common to the figures.

DESCRIPTION

The invention will be primarily described within the context of systems, methods, apparatus and other mechanisms requiring authorization of customer premises equipment (CPE) and subscriber devices at a customer/subscriber service location by requiring CPE access via a location-specific CPE access device, such as a home cable modem, router or other home network element.

Figure 1:
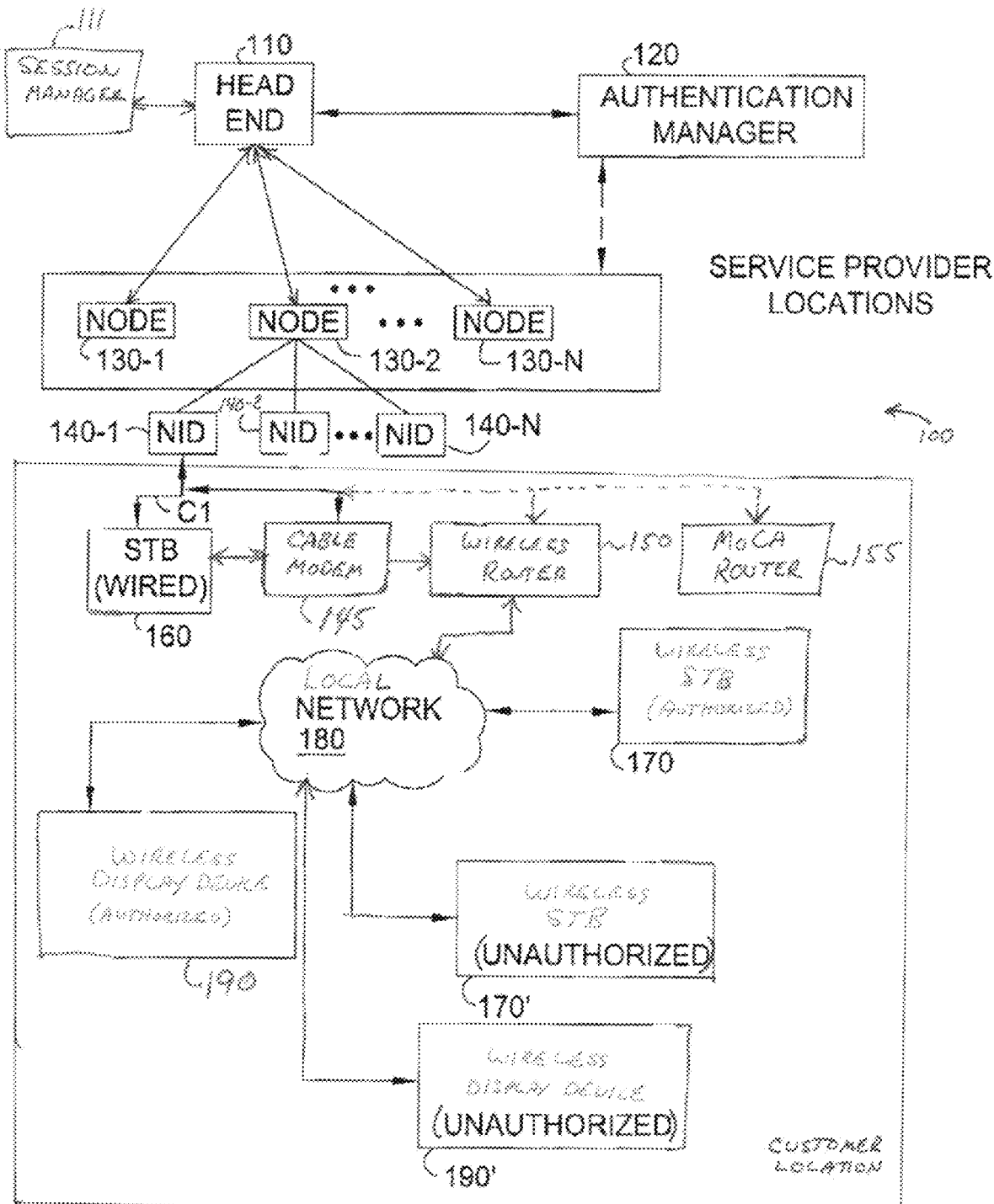
FIG. 1 depicts a high-level block diagram of a system according to one embodiment.

FIG. 1 depicts a simplified block diagram of a broadband services delivery network benefiting from the various embodiments. Specifically, the broadband services delivery network 100 of FIG. 1 as depicted comprises a cable or Internet television distribution/delivery network, though other types of distribution/delivery networks may benefit from the various embodiments.

The broadband services delivery network 100 comprises, illustratively, a head end 110 adapted to communicate with an authentication manager 120, a session manager 111 and a plurality of nodes 130-1 through 130-N (collectively nodes 130).

The head end 110, which may include or otherwise cooperate with the session manager 111, may comprise a cable television head end or network server operative to provide broadband services to subscribers/customers, manage subscriber/customer sessions, propagate content toward subscribers/customers, interact with subscriber/customer CPE and the like. The head end 110 may also provide various session management functions associated with the services instantiated by or on behalf of various subscribers/customers of the service provider. Session management functions generally include sending data to CPE such as commands, encryption keys and the like, receiving data from CPE such as information stream requests, session initiation data (set-top identification, authorization information etc.), user interaction information and the like.

Each of the nodes 130 is adapted to communicate with a respective group of subscribers/customers via respective CPE located at the subscriber/customer house or premises. Subscriber/customer CPE may comprise, illustratively, network interface devices 140, cable modems 145, fiber to the home (FTTH) or other types of wireless routers 150, a Multimedia over Coax (MoCA) routing device 155, wired set-top boxes (STBs) 160, wireless STBs 170 (e.g., managed STBs), wireless display devices 190 (managed/smart display devices) and the like. Other types of CPE may also be utilized as will be appreciated by those skilled in the art.

Referring to FIG. 1, node 130-2 is depicted as communicating with a group of network interface devices (NIDs) 140-1 through 140-N (collectively network interface devices 140). However, in various embodiments where the NID 140 is not necessary to connect the node 130 and subscriber/customer CPE, the node 130 and subscriber/customer CPE is connected directly or via some other interface mechanism.

The authentication manager 120 comprises a management entity adapted to implement various CPE authorization mechanisms as discussed herein with respect to the various embodiments. The authentication manager 120 may be implemented as a standalone entity interacting with CPE via the head end 110, via a node 130 or via some other network entity in direct or indirect communication with CPE to be authorized. In various embodiments, the authentication manager 120 is included as a module or element within the head end 110 and/or node 130. The authentication manager 120 may be implemented within, or interact with, one or more of the nodes 130 to provide a CPE authorization mechanism for respective groups of subscribers/customers.

FIG. 1 depicts CPE at a location such as a house or business address receiving services via a NID 140-1 operatively coupled to a service provider network via a node 130-2. Further, the location is depicted as including exemplary valid CPE such as wireless router 150, wired STB 160, authorized wireless STB 170 and authorized wireless display device 190, as well as exemplary invalid CPE such as unauthorized wireless STB 170' and unauthorized wireless display device 190'.

Valid or authorized CPE comprises CPE that is authorized for use by the subscriber at the service location, while invalid or unauthorized CPE comprises CPE that is not authorized for use by the subscriber at the location. Invalid CPE may comprise, illustratively, CPE authorized for subscriber use at a first location (e.g., authorized service location such as a subscriber's home or office) but not authorized for use at a second location (e.g., subscriber's vacation house or a hotel).

The wired STB 160 comprises, illustratively, a cable television or IP STB or terminal connected to the NID 140-1 or network node 130-2 via, illustratively, a coaxial cable, optical cable or hybrid fiber-coax cable connection or signal path denoted as C1. The STB 160 may receive video content and the like, electronic program guides and so on to provide television services such as adapted for display upon a presentation device (not shown).

The cable modem 145 comprises, illustratively, a routing or switching device connected to the NID 140-1 or network node 130-2 via the connection or signal path denoted as C1.

The wireless router 150 comprises, illustratively, a routing or switching device connected to the NID 140-1 or network node 130-2 via the connection or signal path denoted as C1 either directly or via the cable modem 145. The wireless router 150 includes various radio transceivers (not shown) operative to wirelessly route packets to and from other wireless devices, such as those adhering to one or more of the various Wi-Fi standards channels, such as via 802.11x network 180 (where x=a, b, n, g or any other indicator of a particular Wi-Fi protocol or revision thereof).

The wireless STBs 170/170' and wireless display devices 190/190' perform similar functions to that described above with respect to STB 160, except that wireless STBs 170/170' and wireless display devices 190/190' communicate/interact with head end 110 via channels that traverse the Wi-Fi network 180.

The wireless STB 170 and wireless display device 190 are authorized to use the services provided via the Wi-Fi network 180 since this CPE is authorized for use by the subscriber/customer associated with the service location.

The wireless STB 170' and wireless display device 190' are not authorized to use the services provided via Wi-Fi network 180 since this network is only authorized to provide services to subscriber/customer CPE associated with the same location and the wireless STB 170' and wireless display device 190' devices are associated with another (unauthorized) location or no location at all.

In various embodiments, an authorization protocol is implemented wherein subscriber/customer CPE requests services such as television, video on demand, Internet access, streaming audio and the like via the service provider from a location where the subscriber/customer CPE is not authorized to receive such services.

In various embodiments, the authorization protocol operates to perform various steps such as to confirm the requesting subscriber device is behind a cable modem or other CPE network access device associated with the service provider network, validate the Media Access Control address (MAC address) and/or the device ID of the cable modem or other CPE network access device to a customer account to establish that the cable modem or other CPE network access device is at an authorized service location (e.g., a valid/authorized subscriber's home or office) with respect to the requested subscriber services, confirm that the requesting device is accessing the cable modem directly or via a known, secured Wi-Fi access point (WAP) associated with the authorized service location and so on. In various embodiments, the protocol operates to confirm that the number of active concurrent streams for subscriber account would not exceed an allowable or threshold number of streams (as governed by, e.g., subscriber agreement or network management requirements). Assuming the requesting CPE is authorized at the location and any other criteria are met, the delivery of the services may then be provided.

In various embodiments, sessions associated with non-authenticated and/or not authorized CPE are terminated or degraded by any network elements communicating there with, such as the corresponding wireless router 150, NID 140, node 130, head end 110, authentication manager 120 (wherever implemented) and/or any appropriate session management entity.

In various embodiments, the authentication manager 120 is included within or cooperates with the head end 110 to provide a global or system wide mechanism for managing wireless CPE authentication by sequentially, selectively and/or randomly invoking an authorization protocol at some or all of the locations serviced by the head end 110.

In various embodiments, the authentication manager 120 is included within or cooperates with an individual node 130 to provide a neighborhood or node wide mechanism for managing wireless CPE authentication by sequentially, selectively and/or randomly invoking an authorization protocol at some or all of the locations serviced by the nodes 130. Each of the nodes 130 may be associated with a respective authentication manager 120. Groups of nodes 130 may be associated with a common authentication manager.

In various embodiments, the authentication manager 120 is included within or cooperates with an individual wireless router 150 to provide a localized mechanism for managing wireless CPE authentication by sequentially, selectively and/or randomly invoking an authorization protocol for some or all of the wireless CPE at a specific service location.

In various embodiments, the authentication manager 120 is not used; rather, individual wireless routers 150 periodically invoke an authorization protocol to identify wireless CPE having the same service location as the wireless router.

In various embodiments, the wireless router 150 is configured to terminate or degrade sessions associated with wireless CPE at unauthorized locations.

In various embodiments, information pertaining to CPE identified as local with respect to the wireless router 150 may be propagated toward the head end 110 or other session management entity such that sessions associated with non-authorized wireless CPE may be terminated or degraded.

Various embodiments contemplate that a CPE access device is valid for providing subscriber services only if the CPE access device is determined to be located in accordance with subscriber account information, such as a subscriber's home, business or other authorized service location. This authorized service location may be determined with respect to network topology, neighboring nodes of the CPE access device, an appropriate location-based application using global positioning system (GPS) data, radio triangulation data, network topology data and so on.

Various embodiments contemplate that only devices previously registered by a subscriber with the network provider may be used to access subscriber services associated with that subscriber. Where device not previously registered is used to request to subscriber services, various embodiments may provide a registration mechanism to enable the subscriber to register the requesting device. Generally speaking, registered subscriber devices meet appropriate security requirements, are tied to a particular subscriber account, and one or more authorized service locations associated with that subscriber account.

Various embodiments contemplate that only devices meeting appropriate security requirements are able to receive subscriber services. For example, devices that do not provide an appropriate level of digital rights management (DRM) or other content or licensing security may be denied subscriber services. Similarly, devices that do not provide an appropriate level of a network security may also be denied subscriber services or, in some cases, network connectivity of any type. For example, poorly designed devices or devices provided by manufacturers known to exhibit poor DRM or network security (or malware, or backdoors or other network security deficiencies) may be denied subscriber services and optionally locked out of the network upon identification of the manufacturer (assuming all devices from the manufacturer or suspect), make/model number and so on.

Figure 2:
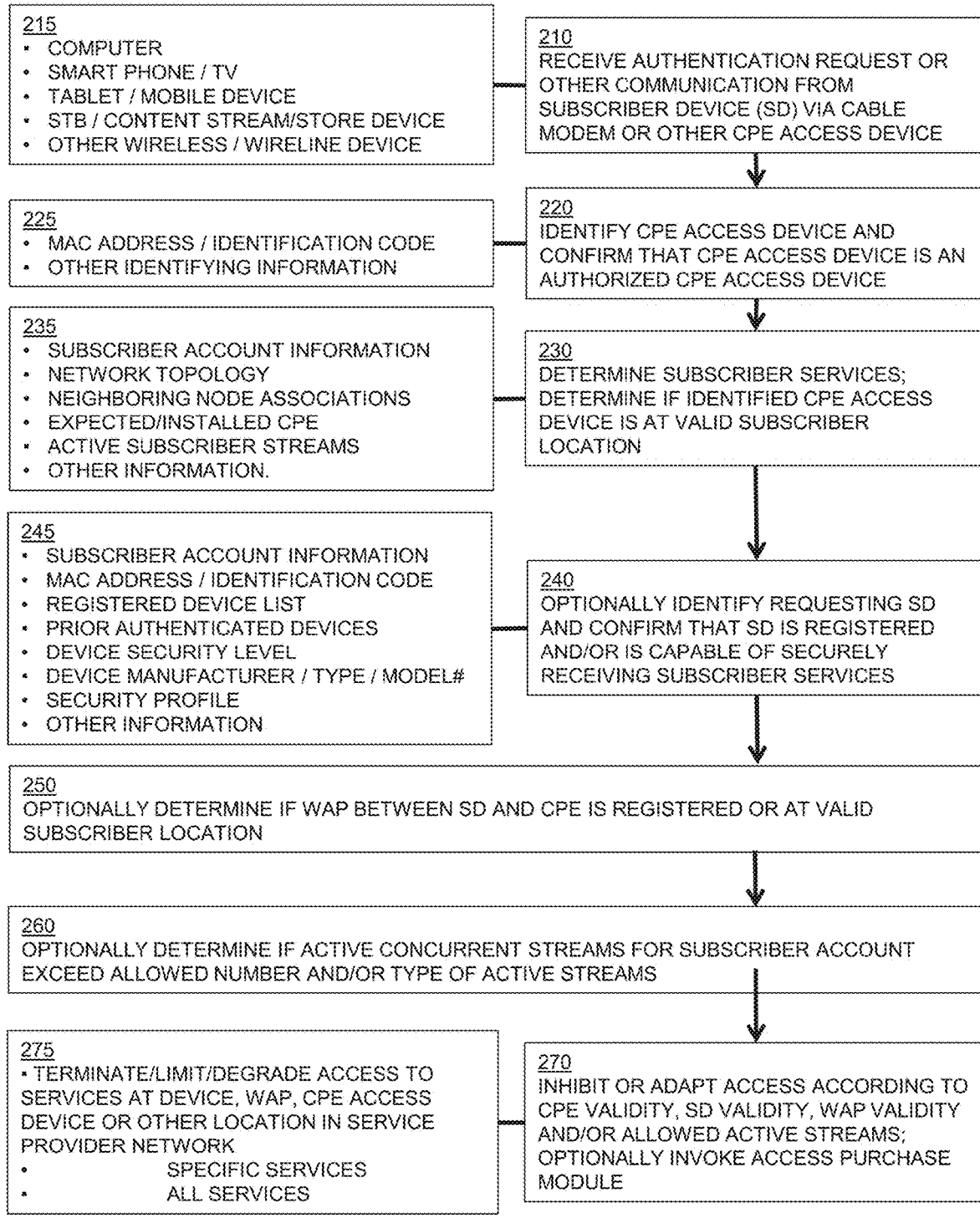
FIG. 2 depicts a flow diagram of a method according to various embodiments.

FIG. 2 depicts a flow diagram of a method according to various embodiments. Specifically, FIG. 2 depicts a flow diagram of location constraining CPE authorization method or protocol adapted to ensure that CPE utilizing a location specific Wi-Fi network, network interface or cable modem are authorized to access services from this location. The method 200 of FIG. 2 may be performed in whole or in part at a service provider head end, server, billing entity, management entity or other service provider device or entity. Portions of the method 200 may be performed by requesting relevant information from third-party services such as billing services, location services, equipment manufacturers and so on.

At step 210, an authentication request or other communication is received from a subscriber device (SD) or other device via a cable modem, wireless access point (WAP) or other CPE access device. Referring to box 215, the subscriber device or other device may comprise a computer, smart phone or television, tablet or other mobile device, set top box (STB) or content streaming/storing device, or any other wireless/wireline device requesting services via the CPE access device.

At step 220, the CPE access device is identified to confirm that the CPE access device is in fact an authorized CPE access device within the service provider network. Referring to box 225, the CPE access device may be identified with respect to a Media Access Control address (MAC address), built-in identification code and/or other identifying information associated with the CPE access device.

At step 230, a determination is made as to whether the identified CPE access device requesting subscriber services is authorized to receive the requested services at the requesting CPE access device service location. That is, is the location of the requesting CPE access device proximate an authorized service location with respect to the requested subscriber services. Referring to box 235, valid subscriber service location information may be determined by confirming that the device supporting subscriber services is proximate to an authorized service location associated with the subscriber associated with the request services using service provider records. Such records may be stored within a lookup table, database or other mechanism associated with the service provider. Service provider information useful for this purpose may include information pertaining to network topology (e.g., where the CPE fits in the topology), neighboring node associations (e.g., network nodes are neighboring nodes with respect to the CPE), expected or installed CPE at various locations including the subscriber location, currently active subscriber streams (e.g., whether the CPE is currently supporting streams for the relevant subscriber) and/or other information.

Generally speaking, each network service provider knows precisely which CPE access devices are authorized for use within the network, the physical location of each authorized CPE access device, the logical or network topology location of each authorized CPE device and so on.

Each CPE access device is associated with a particular customer and a particular location. The location of the CPE access device may be determined by noting the various network elements directly communicate with the CPE access device. For example, a cable modem 145 or wireless router 150 communicates with the head end 110 via as specific NID 140, node 130 and other provider equipment nodes and communication's links. Further, various protocols use within the context of delivery network services provide additional means of determining the location of a particular CPE access device. Thus, a map or connections characteristic associated with a particular CPE access device may be derived and associated with a subscriber location. Other techniques may also be used to associate a CPE axis device with a particular subscriber location.

At step 240, the requesting subscriber device or other device is identified to confirm that this device is registered to the relevant subscriber and/or is capable of securely receiving subscriber services. That is, in some embodiments it is necessary for a subscriber to register any devices with the service provider before the service provider will provide any subscriber services thereto. Similarly, in some embodiments it is necessary for a device receiving subscriber services to meet certain security requirements such as digital rights management (DRM), network security protocols, anti-spoofing protocols and other security requirements prior to allowing the device to receive subscriber services (or even being recognized by the provider network). Referring to box 245, subscriber account information along with MAC address and/or device identification codes (e.g., serial number, universal ID and the like), a list of registered devices, a list of previously authenticated/authorized devices and the like may be used to identify the requesting device and confirm registration of that device to the relevant subscriber account. Further, device security level information may be identified via the information stored within the device, by noting the device manufacturer, type and/or model number (e.g., for comparison with known security sufficient or security inadequate device lists), by identifying a security profile associated with the device and/or via other information.

At step 250, an optional determination is made as to whether a wireless access point (WAP) connecting the requesting subscriber device and CPE access device is valid for the relevant subscriber location. For example, if a subscriber associated with two different locations (e.g., primary authorized premises and vacation premises) has a WAP authorized for the first location, use of the WAP at the second location may not be authorized (depending upon the subscriber agreement). For example, the optional determination made at step 250 may note that the WAP is communicating via a cable modem or other CPE access device associated with a second location and, therefore, use of the WAP at this second location is prohibited.

At step 260, an optional determination is made as to the number of active concurrent streams associated with the subscriber account including the location of the requesting subscriber device. For example, a determination may be made as to whether an allowed number of active streams associated with the subscriber is or would be exceeded if the requested services were provided. Similarly, a determination may be made as to whether a type of active stream not associated with the subscriber agreement would be delivered if the requested services were provided. Generally speaking, the optional determination constrains provided services to the number and type of services/streams contemplated by the subscriber agreement.

At step 270, CPE access in response to the requesting subscriber device or other device is adapted according to CPE validity, subscriber device validity, WAP validity and/or allowed number/type of active streams. Optionally, an offer to purchase access to some or all subscriber services may be made by invoking an access purchase module or routine capable of interacting with a user of the unauthorized device to enable the user to purchase access to some or all of any available subscriber services. In this manner, the user of the unauthorized device (e.g., an authorized user attempting to use the device outside of a predefined geographical range) may purchase access to (i.e., become authorized to receive) some or all of subscriber services available at the location of the requesting subscriber device or other device. Referring to box 275, such adaptation may comprise terminating, limiting or otherwise degrading network services and/or access to the subscriber device itself, and/or a WAP or CPE access device in communication with the subscriber device. Further, terminating, limiting or otherwise degrading network services may also be implemented elsewhere in the service provider network, may be performed for only some services (e.g., video, only high definition video), or all services (e.g., all data and voice services).

Figure 3:
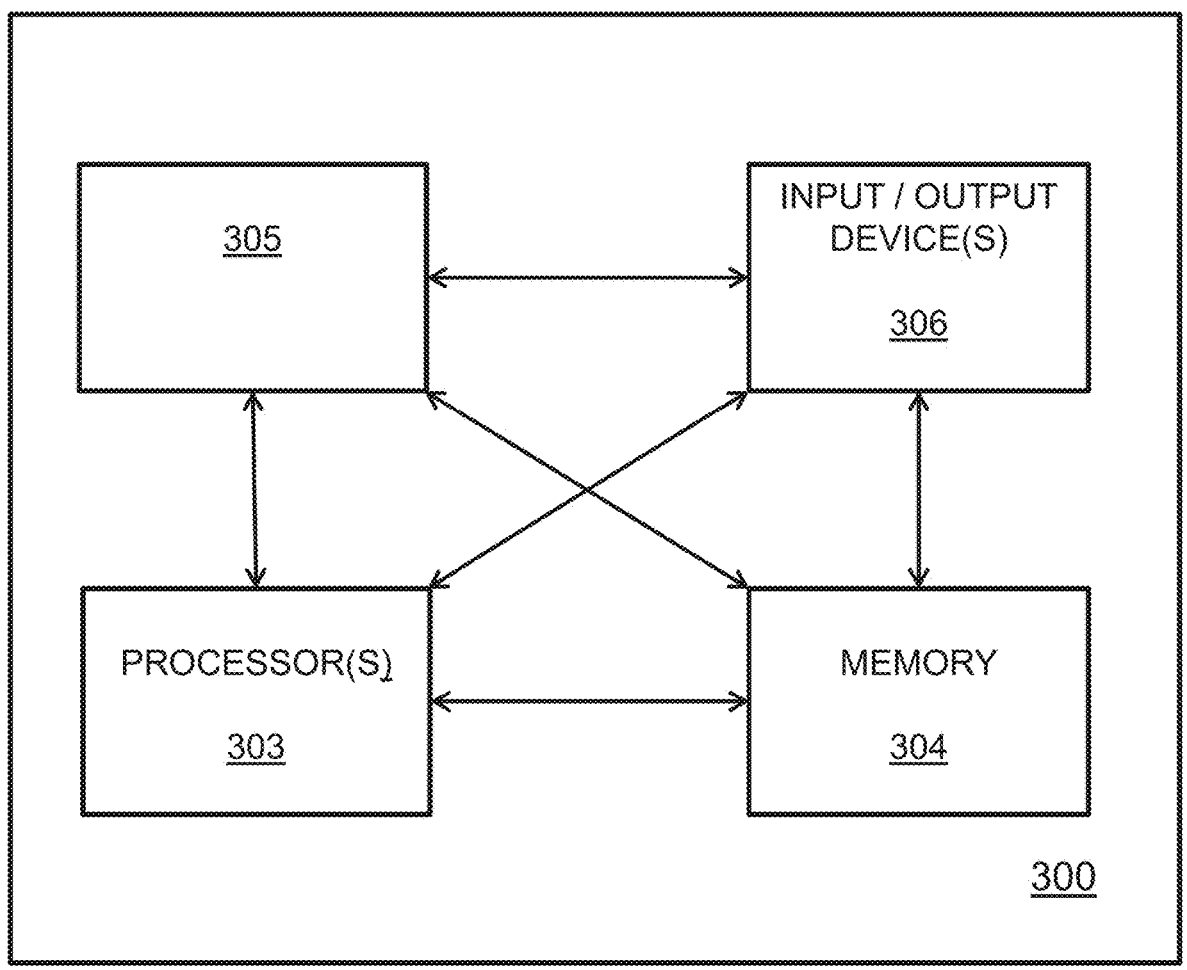
FIG. 3 depicts a high-level block diagram of a computer suitable for use in performing the functions described herein.

FIG. 3 depicts a high gi level block diagram of a computing device, such as a processor in a telecom network element, suitable for use in performing functions described herein such as those associated with the various elements described herein with respect to the figures.

As depicted in FIG. 3, computing device 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., RAM memory, magnetic or optical drive or diskette, and the like.

It will be appreciated that computing device 300 depicted in FIG. 3 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions. Various embodiments contemplate an apparatus including a processor and a tangible storage medium. The processor executing program logic/instructions stored in the tangible storage medium to implement thereby the functions described herein.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method of authorizing a device requesting authorization to receive subscriber services via a network, comprising:
identifying, at an authentication manager within provider equipment (PE), a customer premises equipment (CPE) access device in communication with the device requesting authorization for receiving subscriber services via said CPE access device;
determining a physical location associated with said CPE access device;
authorizing said device requesting authorization if the CPE access device physical location is a valid service location for a subscriber account associated with requested subscriber services;
inhibiting authorization of said device requesting authorization if the CPE access device physical location is not a valid service location for a subscriber account associated with requested subscriber services;

determining whether said CPE access device is registered to receive said requested subscriber services; and inhibiting authorization of said device requesting authorization if said CPE access device is not registered to a subscriber account associated with requested subscriber services;

wherein inhibiting authorization of said device requesting authorization comprises at least degrading access to specific subscriber services.

2. The method of claim 1, further comprising:
determining whether said device requesting authorization is capable of securely receiving and managing said requested subscriber services; and
inhibiting authorization of said device requesting authorization if said device is not capable of securely receiving and managing said requested subscriber services.

3. The method of claim 2, wherein determining whether said device requesting authorization is capable of securely receiving and managing said requested subscriber services is determined using information indicating a manufacturer of said device for receiving subscriber services.

4. The method of claim 2, wherein determining whether said device requesting authorization is capable of securely receiving and managing said requested subscriber services is determined using information indicating a make and model number of said device for receiving subscriber services.

5. The method of claim 1, wherein said CPE access device physical location is determined in accordance with a network topology.

6. The method of claim 1, wherein said CPE access device physical location is determined in accordance with neighboring network elements in communication with said CPE access device.

7. The method of claim 1, wherein said CPE access device is identified using a media access control (MAC) address.

8. The method of claim 1, wherein said CPE access device is identified using an identification code embedded therein.

9. The method of claim 1, further comprising:
determining a physical location of a wireless access point (WAP) supporting communications between said device requesting authorization and said CPE access device; and
inhibiting authorization of said device requesting authorization if said WAP physical location is not a valid location associated with said subscriber account information.

10. The method of claim 1, further comprising:
determining a number of active concurrent streams associated with said subscriber account; and
authorizing said device requesting authorization to receive network services only if a number of active concurrent streams associated with said subscriber account would not exceed an allowed number of concurrent streams.

11. The method of claim 1, wherein inhibiting authorization of said device requesting authorization comprises terminating or degrading access to all subscriber services.

12. The method of claim 1, wherein inhibiting authorization of said device requesting authorization comprises terminating or degrading access to specific subscriber services.

13. The method of claim 2, wherein inhibiting authorization of said device requesting authorization comprises terminating or degrading access to specific subscriber services.

14. The method of claim 9, wherein inhibiting authorization of said requesting authorization comprises degrading access to specific subscriber services.

15. The method of claim 1, further comprising invoking an access purchase module enabling the purchase of subscriber services at the device for receiving subscriber services.

16. An apparatus, comprising a processor and a storage medium for tangibly storing thereon program logic for execution by the processor, the program logic configured to cause said apparatus to perform a method of authorizing a device requesting authorization to receive subscriber services via a network, comprising:
identifying a customer premises equipment (CPE) access device in communication with the device requesting authorization for receiving subscriber services via said CPE access device;
determining a physical location associated with said CPE access device;
authorizing said device requesting authorization if the CPE access device physical location is a valid service location for a subscriber account associated with requested subscriber services;
inhibiting authorization of said device requesting authorization if the CPE access device physical location is not a valid service location for a subscriber account associated with requested subscriber service;
determining whether said CPE access device is registered to receive said requested subscriber services; and
inhibiting authorization of said device requesting authorization if said CPE access device is not registered to a subscriber account associated with requested subscriber services;
wherein inhibiting authorization of said device requesting authorization comprises at least degrading access to specific subscriber services.

17. A tangible and non-transitory computer readable storage medium storing instructions which, when executed by a computer, adapt the operation of the computer to provide a method of authorizing a device requesting authorization to receive subscriber services via a network, comprising:
identifying a customer premises equipment (CPE) access device in communication with the device requesting authorization for receiving subscriber services via said CPE access device;
determining a physical location associated with said CPE access device;
authorizing said device requesting authorization if the CPE access device physical location is a valid service location for a subscriber account associated with requested subscriber services;
inhibiting authorization of said device requesting authorization if the CPE access device physical location is not a valid service location for a subscriber account associated with requested subscriber service;
determining whether said CPE access device is registered to receive said requested subscriber services; and
inhibiting authorization of said device requesting authorization if said CPE access device is not registered to a subscriber account associated with requested subscriber services;
wherein inhibiting authorization of said device requesting authorization comprises at least degrading access to specific subscriber services.

18. A computer program product comprising a non-transitory computer readable medium, wherein computer instructions stored in the non-transitory computer-readable medium, when executed by a processor in a network management element, adapt the operation of the network management element network element to perform a method of authorizing a device requesting authorization to receive subscriber services via a network, comprising:
- identifying a customer premises equipment (CPE) access device in communication with the device requesting authorization for receiving subscriber services via said CPE access device;
- determining a physical location associated with said CPE access device;
- authorizing said device requesting authorization if the CPE access device physical location is a valid service location for a subscriber account associated with requested subscriber services;
- inhibiting authorization of said device requesting authorization if the CPE access device physical location is not a valid service location for a subscriber account associated with requested subscriber services;
- determining whether said CPE access device is registered to receive said requested subscriber services; and
- inhibiting authorization of said device requesting authorization if said CPE access device is not registered to a subscriber account associated with requested subscriber services;
- wherein inhibiting authorization of said device requesting authorization comprises at least degrading access to specific subscriber services.

* * * * *